United States Patent
Perez Lopez et al.

(10) Patent No.: US 11,579,368 B2
(45) Date of Patent: Feb. 14, 2023

(54) DIRECTIONAL PHOTONIC COUPLER WITH INDEPENDENT TUNING OF COUPLING FACTOR AND PHASE DIFFERENCE

(71) Applicant: UNIVERSITAT POLITÈCNICA DE VALENCIA, Valencia (ES)

(72) Inventors: Daniel Perez Lopez, Valencia (ES); José Capmany Francoy, Valencia (ES); Ivana Gasulla Mestre, Valencia (ES); Erica Sánchez Gomáriz, Valencia (ES)

(73) Assignee: UNIVERSITAT POLITÈCNICA DE VALÈNCIA, Valencia (ES)

( * ) Notice: Subject to any disclaimer, the term of this patent is extended or adjusted under 35 U.S.C. 154(b) by 0 days.

(21) Appl. No.: 17/290,062

(22) PCT Filed: Oct. 9, 2019

(86) PCT No.: PCT/ES2019/070683
§ 371 (c)(1),
(2) Date: Apr. 29, 2021

(87) PCT Pub. No.: WO2020/089495
PCT Pub. Date: May 7, 2020

(65) Prior Publication Data
US 2021/0396932 A1 Dec. 23, 2021

(30) Foreign Application Priority Data
Oct. 31, 2018 (ES) .................. P201831055

(51) Int. Cl.
*G02B 6/293* (2006.01)
*G02F 1/225* (2006.01)
*H01Q 3/26* (2006.01)

(52) U.S. Cl.
CPC ...... *G02B 6/29355* (2013.01); *G02B 6/29395* (2013.01); *G02F 1/225* (2013.01); *H01Q 3/2676* (2013.01)

(58) Field of Classification Search
CPC ............ G02B 6/29355; G02B 6/29395; G02B 6/125; G02B 6/29332; G02B 2006/12147; G02B 6/29352; G02B 6/26; G02B 6/287; G02F 1/225; G02F 1/3132
See application file for complete search history.

(56) References Cited

U.S. PATENT DOCUMENTS

| 5,375,180 A | 12/1994 | Murphy |
| 7,664,346 B2* | 2/2010 | Mizumoto ............ G02F 1/0955 385/11 |
| 2009/0180731 A1 | 7/2009 | Christensen et al. |

FOREIGN PATENT DOCUMENTS

| EP | 1259855 A1 | 11/2002 |
| FR | 3058235 A1 | 5/2018 |
| WO | 02063389 A1 | 8/2002 |

OTHER PUBLICATIONS

Khurgin et al.. Tunable wideband optical delay line based on balanced coupled resonator structures, Optics Letters, Sep. 1, 2009, pp. 2655-2657, vol. 34, No. 17, Optical Society of America, US.

(Continued)

*Primary Examiner* — John Bedtelyon
(74) *Attorney, Agent, or Firm* — The Webb Law Firm (57) ABSTRACT

The present invention discloses a directional photonic coupler (1) with independent tuning of the coupling factor and phase difference. The coupler comprises: two waveguides (4, 5), with respective propagation constants "$\beta_1, \beta_2$", on which phase shifters (6, 7) configured to modify the propagation coefficients are located. Both phase shifters are configured such that, by independent modification (differential or unique) of the propagation coefficients, the power coupling factor (K) between an input signal (2a or 2b) and the output signals (3b and 3a) is tuned, and by equal and (Continued)

simultaneous modification of the propagation coefficients, the common phase difference of the optical output signals (3a, 3b) is tuned. A third phase shifter (15) can be used to retune the phase difference at the input/output of one of the waveguides. The coupler is of particular interest in PIC circuits, coupled resonators, Mach-Zehnder interferometers and mesh structures.

15 Claims, 3 Drawing Sheets

(56) References Cited

OTHER PUBLICATIONS

Pérez-López et al., Programmable True Time Delay Lines Using Integrated Waveguide Meshes, Journal of Lightwave Technology, Oct. 1, 2018, pp. 4591-4601, vol. 36, No. 19, US.

Mak et al., "Programmable Mutli-Ring Butterworth Filters with Automated Resonance and Coupling Tuning", Optical Society of America, 2016, pp. 1-3.

Orlandi et al., "Tunable silicon photonics directional coupler driven by transverse temperature gradient", Optics Letters, 2013, pp. 863-865, vol. 38:6.

Zhu et al., "A Compact Tunable Directional Coupler with Continuously Tuned Differential Phase", IEEE Microwave and Wireless Components Letters, 2018, pp. 19-21, vol. 28:1.

* cited by examiner

DIRECTIONAL PHOTONIC COUPLER WITH INDEPENDENT TUNING OF COUPLING FACTOR AND PHASE DIFFERENCE

CROSS-REFERENCE TO RELATED APPLICATIONS

This application is the United States national phase of International Application No. PCT/ES2019/070683 filed Oct. 9, 2019, and claims priority to Spanish Patent Application No. P201831055 filed Oct. 31, 2018, the disclosures of which are hereby incorporated by reference in their entirety.

BACKGROUND OF THE INVENTION

Field of the Invention

The objective of the present disclosure is to enable independent tuning of the coupling factor and the output phase of directional photonic couplers (TDC—Tunable Directional Couplers).

The technical field of the disclosure is the field of photonics, integrated optical circuits (PIC—Photonic Integrated Circuits) and within same, directional photonic couplers.

The present disclosure is applicable in many photonic and RF-photonic functionalities such as: Reconfigurable photonic integrated circuits/optical networks; RF-photonics optical filtering; photonic beam forming networks for tunable phased array antennas; generation and forming of arbitrary waveforms; analog-to-digital conversion; photonic radar; controlled signal distribution; advanced photonic instrumentation; optoelectronic oscillators, and quantum computing.

Description of Related Art

Directional couplers in the field of photonics are widely known and used in integrated optical circuits. They are used for splitting the signal from one of its two input ports to two output ports with a specific coupling percentage at each port in a fixed manner. Tunable directional couplers are also included in the state of the art. They enable the coupling coefficient to be modified by means of applying a phase difference in one of the two guides making up the device (or applying a differential phase difference between them). One example of a device of this type is disclosed in patent application with publication number U.S. Pat. No. 5,375,180A.

Basic directional photonic couplers, as well as those which enable the coupling coefficient to be tuned, impose a fixed coupling coefficient-dependent phase difference at the output. Given that these elements are usually integrated in structures that exploit the interference between signals such as multiport interferometers or cavities, phase tuning is as essential as the coupling coefficient for the proper circuit optimization and configuration. In other words, as the suppressed signal is modified (i.e., the coupling factor is modified), the frequency (phase difference of the filter) of the output is modified in an undesired manner. And all this as a result of the mere construction of directional couplers.

One of the solutions of the state of the art disclosed in patent application EP1259855A1 consists of arranging two couplers in series, wherein each coupler has two waveguides having different widths and are inverted with respect to one another, such that when a waveguide of one coupler is coupled with another waveguide with a different width of the following coupler, this last coupler would try to passively compensate for the phase difference introduced by the first coupler.

Taking into account the current state of the art, it would be desirable to be able to obtain a photonic device which overcomes the problems of the state of the art indicated above.

SUMMARY OF THE INVENTION

In order to eliminate the main limitation of the state of the art, a design consisting of a directional photonic coupler capable of independently tuning the coupling coefficient and the phase at the output of the coupler is proposed. To that end, an architecture in which the signal propagation conditions of both arms (waveguides) can be modified by means of two optical phase shifters is used. The differential (or unique) phase difference thereby modifies the coupling coefficient and a common (or equal) phase difference in both arms enables the overall phase difference applied by the directional photonic coupler to be configured.

In addition to the application thereof in conventional circuits, the directional photonic coupler of the present disclosure is essential for the generation of meshed optical circuits.

To better understand the directional photonic coupler of the present disclosure, the coupling mode theory is set forth below. The optical field at the output of a directional photonic coupler is:

$$A_1(z) = e^{j\left(\frac{\beta_1+\beta_2}{2}\right)z}\left\{\cos\left[\frac{z}{2}\sqrt{\Delta^2+4|\kappa|^2}\right] - j\frac{\Delta}{\sqrt{\Delta^2+4|\kappa|^2}}\sin\left[\frac{z}{2}\sqrt{\Delta^2+4|\kappa|^2}\right]\right\} \quad (1)$$

$$A_2(z) = e^{j\left(\frac{\beta_1+\beta_2}{2}\right)z}\frac{2j\kappa}{\sqrt{\Delta^2+4|\kappa|^2}}\sin\left[\frac{z}{2}\sqrt{\Delta^2+4|\kappa|^2}\right],$$

where "$\beta_1$" and "$\beta_2$" are the propagation coefficients of the modes in the two waveguides; "k" is the coupling coefficient between modes; "z" is the variable defining the coupling length, and "$\Delta$" is the propagation coefficient difference $\beta_1-\beta_2$. The reasoning and the phase of each of the preceding vectors are:

$$|A_1(z)|^2 = \left(\cos^2\left[\frac{z}{2}\sqrt{\Delta^2+4|\kappa|^2}\right] + \frac{\Delta^2}{\Delta^2+4|\kappa|^2}\sin^2\left[\frac{z}{2}\sqrt{\Delta^2+4|\kappa|^2}\right]\right) = \alpha_{TBU}\sqrt{1-K^2} \quad (2)$$

$$|A_2(z)|^2 = \frac{4|\kappa|^2}{\Delta^2+4|\kappa|^2}\sin^2\left[\frac{z}{2}\sqrt{\Delta^2+4|\kappa|^2}\right] = \alpha_{TBU}K,$$

$$\text{Arg}[A_1(z)] = \left(\left(\frac{\beta_1+\beta_2}{2}\right)z - \tan^{-1}\left\{\frac{\Delta\tan\left[\frac{z}{2}\sqrt{\Delta^2+4|\kappa|^2}\right]}{\sqrt{\Delta^2+4|\kappa|^2}}\right\}\right) \quad (3)$$

$$\text{Arg}[A_2(z)] = \left(\frac{\beta_1+\beta_2}{2}\right)z + \frac{\pi}{2},$$

It should be borne in mind that the propagation coefficients "$\beta_1$" and "$\beta_2$" include a real part and an imaginary part, which indicates losses. Additionally, the static contribution and the active contribution can be separated. The static contribution (referred to as subscript "p") accounts for the passive behavior of the waveguides and is determined by the actual fabrication of the directional photonic coupler. The active contribution on each waveguide ($\beta_a$) given by a change in the effective index $\Delta n_{\mathit{eff}}$ comes from each phase shifter.

Taking into account the foregoing, the propagation coefficients can be written as follows if two phase shifters (one for each waveguide) are included in a novel manner:

$$\beta_1 = (\beta_{1p} + \beta_{1a}) + j(\alpha_{1p} + \alpha_{1a}), \qquad (4)$$

$$\beta_2 = (\beta_{2p} + \beta_{2a}) + j(\alpha_{2p} + \alpha_{2a}).$$

If "$\Delta$" is again calculated as the propagation coefficient difference $\beta_1 - \beta_2$, the following is obtained:

$$\Delta = (\beta_{1p} - \beta_{2p}) + (\beta_{1a} - \beta_{2a}) + j(\alpha_{1p} - \alpha_{2p} + \alpha_{1a} - \alpha_{2a}) = \qquad (5)$$

$$\Delta_p + \Delta_a + j(\alpha_{1p} - \alpha_{2p} + \alpha_{1a} - \alpha_{2a}),$$

In other words, the difference "$\Delta$" between the propagation coefficients $\beta_1 - \beta_2$ depends on "$\Delta_p$" which is fixed and predetermined by the actual construction of the directional photonic coupler. The difference "$\Delta$" also depends on "$\Delta_a$" which is a function of the phase shifters.

Considering equations 1 to 4 above, it can be seen that, by modifying the propagation constant $\beta a$, a phase change is introduced in one of the waveguides which change the coupling coefficient K of the directional photonic coupler.

Looking again at the equations above, it can be seen that a common increase in both waveguides, i.e., $\beta 1 a = \beta 2 a$, leads to a fixed coupling factor with the phase response being tuned. In other words, one same variation of the constants $\beta 1 a$ and $\beta 2 a$ allows tuning (increasing or reducing) the phase independently with respect to the coupling factor. That is, the differential or unique phase difference modifies the coupling coefficient and a common or equal phase difference in both arms (waveguides) enables the overall phase difference applied by the structure to be configured. This, together with the way of selecting $\beta 1 a$ and $\beta 2 a$, represents the improvement of the disclosure with respect to the prior art. Specifically, $\beta 1 a$ and $\beta 2 a$ are selected with a phase shifter for each waveguide. Additionally, the phase shifters can be associated with other elements, depending on the tuning technology (thermo-optical, electro-optical, capacitive effects, optical tuning, etc.).

The coupling length depends on the coupling coefficient K, also called power coupling coefficient K. For passive directional photonic couplers where both waveguides are equal, i.e., $\Delta\beta 1p = \Delta\beta 2p$, the coupling length must be equal to:

$$L_{CO} = \frac{\pi}{2|\kappa|}, \qquad (6)$$

If the parallel waveguides are different, $\Delta\beta_{1p} \neq \Delta\beta_{2p}$, then a correction factor should be imposed on the coupling length, resulting in:

$$L_{CO,2} = \frac{L_{CO}}{\sqrt{\left(\frac{\Delta\beta L_{CO}}{\pi}\right)^2 + 1}}, \qquad (7)$$

For 3-dB couplers, the coupler length is half of the total coupling length.

Taking into account the foregoing, a first aspect of the present disclosure teaches a directional photonic coupler with independent tuning of coupling factor and phase difference, comprising:

a first waveguide with propagation constant $\beta_1$ and a second waveguide with propagation constant $\beta_2$;

an input and an output for the first waveguide, and an input and an output for the second waveguide;

a first phase shifter, located at a predetermined distance from the first waveguide, configured to modify the propagation coefficient $\beta_1$ of the first waveguide;

a second phase shifter, located at a predetermined distance from the second waveguide, configured to modify the propagation coefficient $\beta_2$ of the second waveguide;

the first phase shifter and the second phase shifter being configured such that by independent modification (differential or unique) of the propagation coefficient $\beta_1$ and of the propagation coefficient $\beta_2$, respectively, a coupling factor "K" between an optical input signal of one of the waveguides and optical output signals of both waveguides is tuned, and by equal and simultaneous modification of the propagation coefficient $\beta_1$ and of the propagation coefficient $\beta_2$, respectively, the common phase difference of the optical output signals of both waveguides is tuned.

Here, it must be borne in mind that, for a directional coupler made up of two waveguides and as known in the prior art, an "input" signal at the input of a waveguide will propagate through said waveguide, giving rise to two signals, the "direct" signal and the "coupled" signal. The direct signal is the proportion of the input signal found in the output of the input guide. The coupled signal is a second signal generated in the other waveguide due to the action of the electric and magnetic fields generated by the input signal propagating through its corresponding waveguide. The coupling factor "K" establishes the ratio between the power of the coupled signal and the input signal. In this sense, a coupling factor "K" of 0.6 means that the power of the coupled signal will be 60% the power of the input signal, and therefore, the power of the direct signal will be 40% the input signal (assuming ideally that there are no losses).

The independent modification of the propagation coefficient $\beta_1$ and of the propagation coefficient $\beta_2$ can be modified in an independent or unique manner, i.e., the same coupling factor "K" can be obtained, for example, when modifying $\beta_1$ by a value of "0" (no modification) and modifying $\beta_2$ by a value of "7" (unique modification), and when modifying $\beta_1$ by a value of "3" and modifying $\beta_2$ by a value of "10" (differential modification—the difference of "7" is maintained). In contrast, the phase difference in the examples indicated above is different, i.e., for $\beta_1$ with a value of "0" and for $\beta_2$ with a value of "7" and moreover, for $\beta_1$ with a value of "3" and $\beta_2$ with a value of "10", the same coupling factor "K" is obtained but there are two different phase differences.

In an embodiment of the disclosure, the directional photonic coupler further comprises a substrate and a cladding. The cladding is located on the substrate, which comprises therein at least the first waveguide and the second waveguide. Furthermore, the first phase shifter and the second phase shifter can be located on the cladding.

In another embodiment of the disclosure, the directional photonic coupler may further comprise a third phase shifter, located at the input or at the output of any of the waveguides for accessing the waveguide coupler, configured to modify the phase difference corresponding to the (input or output)

port in which the third phase shifter has been located. Therefore, if the third phase shifter is located at the input (input port of the directional photonic coupler) of any of the waveguides, the third phase shifter introduces a phase difference before the phase difference introduced by the first phase shifter and the second phase shifter. If the third phase shifter is located at the output (output port of the directional photonic coupler) of any of the waveguides, the third phase shifter introduces a phase difference after the phase difference introduced by the first phase shifter and the second phase shifter. This third phase shifter is advantageous because it can adjust the phase difference before or after the phase difference obtained by the first phase shifter and the second phase shifter, providing an option for obtaining desired phase difference values that could not be obtained solely with the joint action of the first phase shifter and the second phase shifter. In another embodiment of the disclosure, the directional photonic coupler may further comprise a microprocessor connected to the first phase shifter and to the second phase shifter for the activation thereof, wherein the microprocessor calculates the change in the propagation coefficient $\beta_1$ of the first waveguide to obtain the coupling factor and wherein said microprocessor also calculates the simultaneous variation of the propagation coefficient $\beta_1$ of the first waveguide and the propagation coefficient $\beta_2$ of the second waveguide to obtain the phase difference. Optionally, the microprocessor can additionally be connected to the third phase shifter for the activation thereof. Once having calculated both propagation coefficients with which the desired coupling factor and phase difference is obtained, the microprocessor will activate the phase shifters that will act on the waveguides until the propagation coefficients $\beta_1$ and $\beta_2$ correspond with those calculated by the microprocessor.

In another embodiment of the disclosure, the microprocessor can additionally be connected to total or partial optical power monitors at one or both outputs of the directional photonic coupler for reading and calculating the actual (instantaneous) coupling factor "K". The optical power monitors can be a total or partial optical power monitor.

A second aspect of the disclosure teaches different uses of the directional photonic coupler of the first aspect of the disclosure. Therefore, the use of the directional photonic coupler defined in any one of the embodiments of the first aspect of the disclosure in PIC circuits (programmable interrupt controller), in coupled resonators, in a Mach-Zehnder interferometer, and in photonic structures selected from triangular structures, square structures, hexagonal structures, and mesh structures, is disclosed.

The advantages of the directional photonic coupler of the present disclosure:

- It can provide light beam-splitting operations with reconfigurable coupling values, as well as allow an independent phase change configuration.
- It can be carried out using elements which can be integrated in a chip, and therefore, is completely integrable.
- When implemented as a tunable basic unit in waveguide mesh structures, it allows mesh optimization in terms of power losses and spatial resolution. This has a direct impact on overall mesh performance, allowing the production of more complex devices and operations at higher frequencies.
- It can be programmed to provide fully reconfigurable and tunable optical filter designs and to correct or overcome fabrication errors.

BRIEF DESCRIPTION OF THE DRAWINGS

FIGS. 4a to 4d show different structures in which the directional photonic coupler of the present disclosure can be applied.

DETAILED DESCRIPTION OF THE INVENTION

An embodiment of the disclosure is described in detail below according to the FIGS. that are shown.

Figure 1:
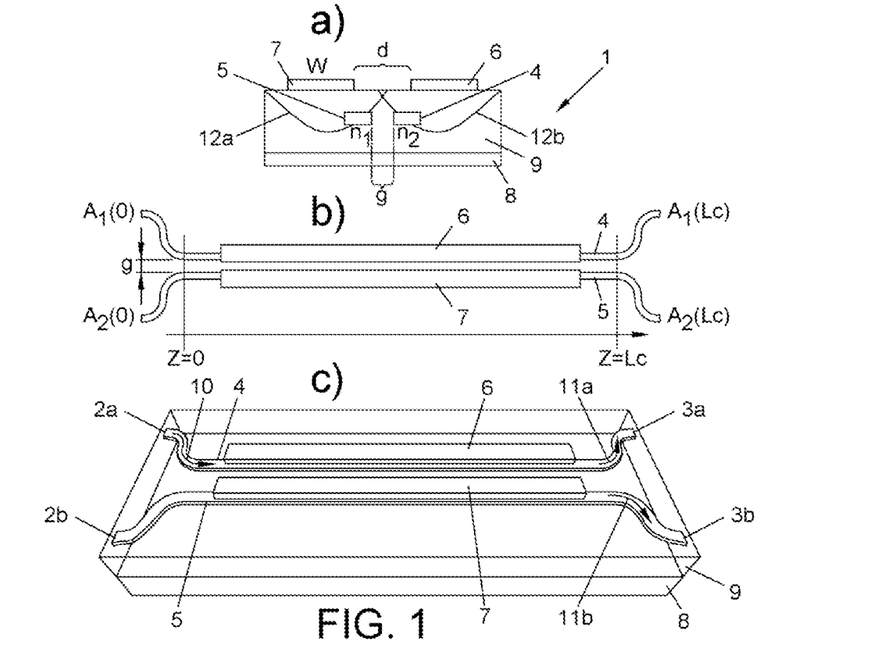
FIG. 1 shows an exemplary embodiment of a directional photonic coupler according to the present disclosure in a section view (FIG. 1a), a plan view (FIG. 1b), and a 3D view (FIG. 1c).

FIG. 1 shows an exemplary embodiment of a directional photonic coupler according to the present disclosure wherein a phase shifter can be seen for each waveguide. Specifically, FIG. 1c shows the directional photonic coupler 1 comprising two waveguides 4 and 5 within a cladding 9, which is located on the substrate 8. Respective phase shifters 6 and 7 are located on each of the waveguides. The waveguides 4 and 5 have their inputs 2a and 2b, respectively, and their outputs 3a and 3b, respectively. Any of the inputs 2a and 2b can be connected to a light source which will supply an input signal 10 with a specific optical power. For the specific case in which the input 2a is fed by the input signal 10, the direct signal 11a will be obtained at the output 3a and the coupled signal 11b will be obtained at the output 3b, the power and phase of which will depend on the coupling factor K with the input signal, as is known in the prior art (with the phase shifters being disconnected). FIG. 1b shows a plan view of the directional photonic coupler 1, but only the waveguides 4 and 5 and the phase shifters 6 and 7 are shown. FIG. 1b also shows how the coupling $A_i(z)$ between signals propagating through the waveguides between z=0 and z=Lc depends. Lastly, FIG. 1a shows a section view of the directional photonic coupler 1 in which there is shown the substrate 8, on which the cladding 9 including the two waveguides 5 and 6 arranged parallel to one another and separated by a distance "g", is deposited, and finally, the phase shifters 6 and 7 having a width "w" arranged parallel to one another and space by a distance "d", are located on the cladding 9. In the particular case of the directional photonic coupler shown in FIG. 1, the virtual joining of the waveguides 5 and 6 would form a plane parallel to the virtual plane formed by the phase shifters 6 and 7. As can be seen in FIG. 1a, each phase shifter has a radius of action 12a, 12b on the waveguide on which it is located.

The effect of each phase shifter on its corresponding waveguide is known as "tuning" and there are currently different tuning technologies. The purpose of tuning technologies is to modify the phase of the (optical) signal circulating through the waveguide. This effect is achieved by modifying the optical properties of the waveguide. Most tuning elements require an electronic power supply that must be guided to the integrated device. Depending on the physics underlying the effect, some examples of tuning are: "thermo-optic tuning": the phase difference is caused by the local modification of temperature. This effect can be produced by passing a current through a metallic layer close to the core of the guide and thereby releasing heat; electro-optical tuning: The passage of electric current through the guide itself modifies its propagation properties, producing the desired phase difference; "capacitive effects, electromechanical effects, MEMs": the geometrical properties of the guide or the pressure in some of its materials are modified to alter/produce a phase difference; "optical tuning": an optical pump or tuning signal is used for interfering with the target signal.

With respect to the "g" or "w" values indicated above, they will depend on several factors such as the tuning technologies described above and/or the fabrication technologies ("Silicon on Insulator", "Silica", "Silicon nitride", "Indium Phospore", "Lithium Niobate on Silicon"). Typical "w" and "g" values are between 0.6 µm and 1.6 µm.

With the configuration shown in FIG. 1 and for any tuning technology described above, the directional photonic coupler 1 of the present disclosure successfully varies the propagation coefficients $\beta_1$ and $\beta_2$ of the waveguides by means of the action of the phase shifter 6 and 7 for independently tuning the coupling factor (K) and the phase difference between the signals propagating through the waveguides 4 and 5.

To achieve the desired coupling factor value between the transmitted signal and the coupled signal, tuning (changing the propagation coefficient $\beta_1$) of one of the waveguides is sufficient, such that a difference is generated between the propagation coefficients of the waveguides. In other words, the propagation coefficient is kept constant if the propagation coefficient difference is kept constant. Moreover, changing the propagation coefficient $\beta_1$ entails a phase change (phase difference) of the signal circulating through the waveguide. If a specific phase difference other than that generated when obtaining the desired coupling factor is desired, modifying the propagation coefficients $\beta_1$ and $\beta_2$ in the same proportion would be sufficient.

To carry out the foregoing, the phase shifters 6 and 7 can be connected to a microprocessor (not shown) which will be responsible for calculating the change in the propagation coefficient $\beta_1$ of the waveguide 4 to obtain the desired coupling factor, and also for calculating the simultaneous variation of the propagation coefficient $\beta_1$ of the waveguide 4 and the propagation coefficient $\beta_2$ of the waveguide 5. Once having calculated both propagation coefficients with which the desired coupling factor and phase difference is obtained, the microprocessor will activate the phase shifters 6 and 7 that will act on the waveguides 4 and 5 until the propagation coefficients $\beta_1$ and $\beta_2$ correspond with those calculated by the microprocessor. Additionally, the microprocessor can be connected to an optical power monitor (not shown), which are connected at one or both outputs of the directional photonic coupler for reading and calculating the coupling factor "K" instantaneously.

Figure 2:
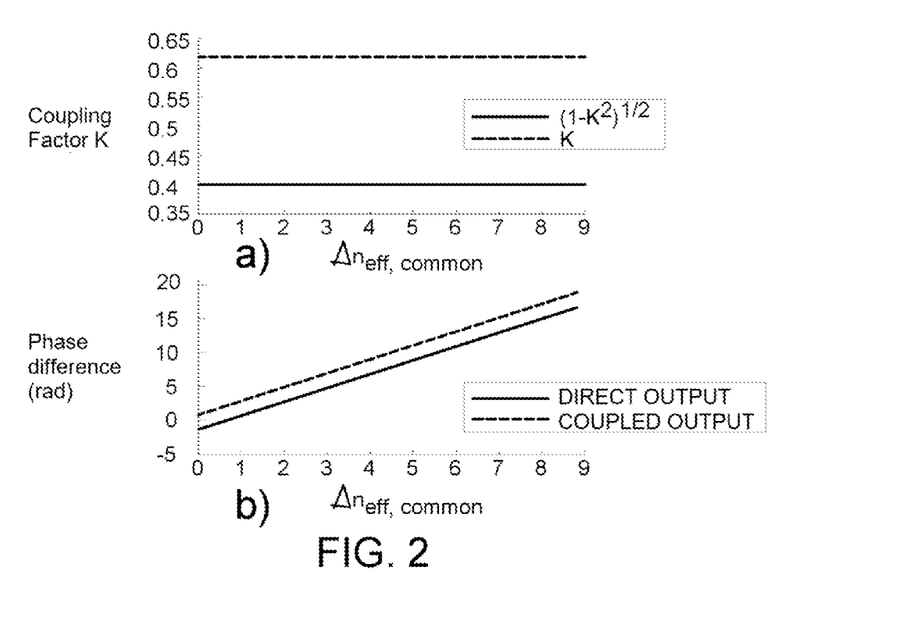
FIG. 2a shows the variation of the coupling factor as a function of the equal increase in the propagation coefficients of the waveguides with the directional photonic coupler of the present disclosure.
FIG. 2b shows the variation of the phase difference as a function of the equal increase in the propagation coefficients of the waveguides with the directional photonic coupler of the present disclosure.

It can be seen in FIGS. 2a and 2b that, by means of the directional photonic coupler of the present disclosure, the coupling factor (K) is kept constant as $\Delta n_{\mathit{eff,common}}$ increases (FIG. 2a) and the phase difference grows as $\Delta n_{\mathit{eff,common}}$ increases (FIG. 2b). It must be borne in mind that $n_{\mathit{eff}}=(\beta_a+\beta_p)2\pi/\lambda$, and therefore, $\Delta n_{\mathit{eff,common}}=[((\beta_{a1}+\beta_{p1})2\pi/\lambda-((\beta_{a2}+\beta_{p2})2\pi/\lambda)]$. So, changes in $\beta_1$ y $\beta_2$ modify the $\beta_a$ value (active part).

Figure 3:
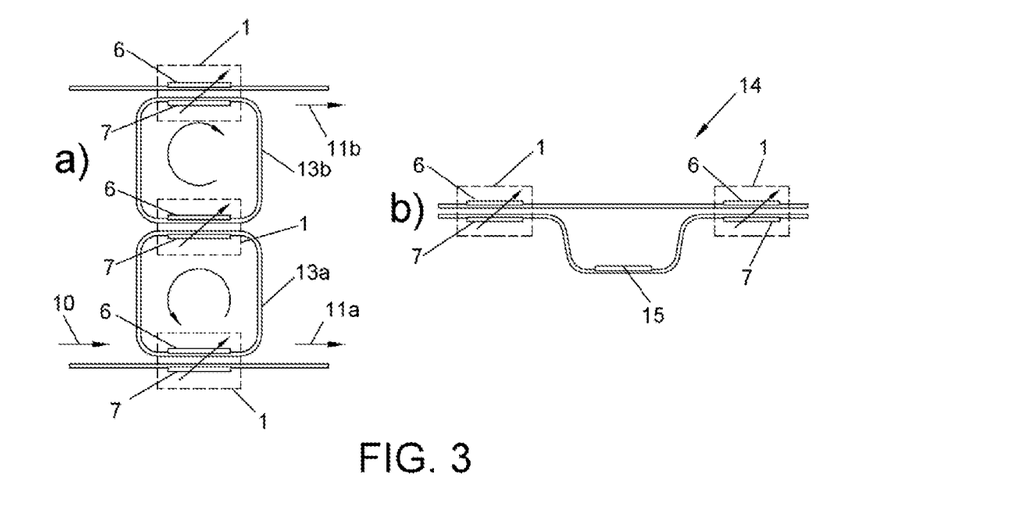
FIG. 3a shows two resonators coupled by means of the directional photonic coupler of the present disclosure.
FIG. 3b shows the application of the directional photonic coupler of the present disclosure in a Mach-Zehnder interferometer.

FIGS. 3a and 3b show applications of the directional photonic coupler of the present disclosure in typical PIC (Photonic Integrated Circuit) designs. Specifically, FIG. 3a shows the directional photonic coupler applied to two coupled resonators 13a, 13b, and FIG. 3b shows the directional photonic coupler applied to a Mach-Zehnder interferometer 14. In both cases, the coupling factor can be programmed by accepting and modifying the power supply of each phase shifter. The phase shifter typically found in one of the arms of the Mach-Zehnder can, for example, be substituted if the TDC design includes the third coupler.

Figure 4:
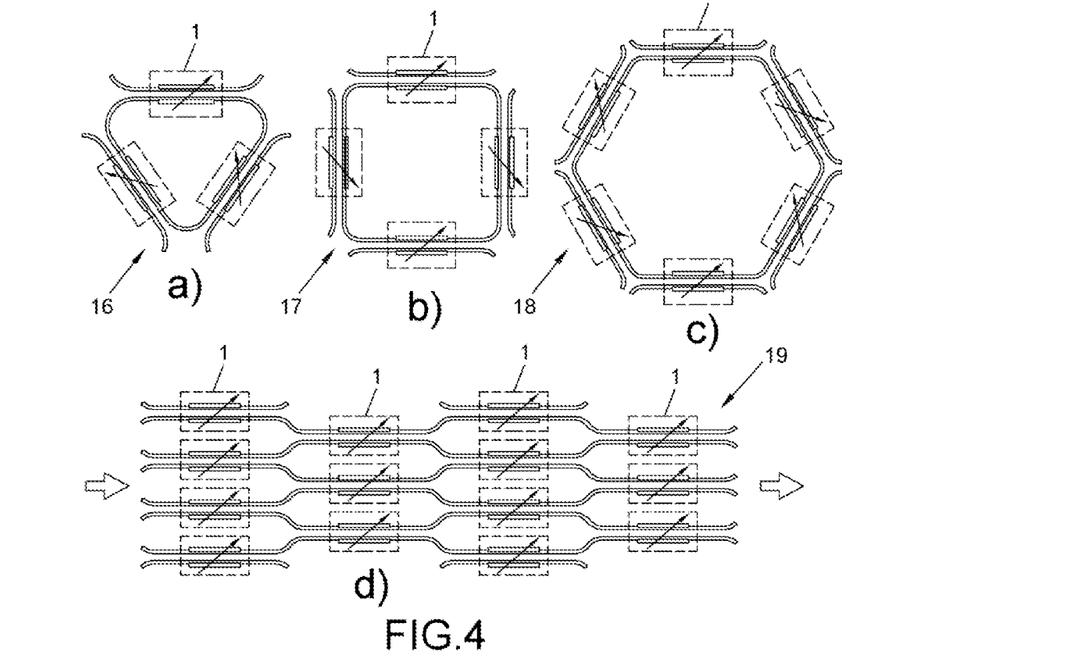
FIG. 4a: a triangular structure.
FIG. 4b: a square structure.
FIG. 4c: a hexagonal structure.
FIG. 4d: a mesh structure.

Another particularly interesting and highly relevant application of the directional photonic coupler in PICs is the field of "waveguide meshes". In a manner similar to the mode of operation of FPGAs (field-programmable gate array), programmable PICs implementing multiport beam splitters can be configured by means of conventional circuit discretization in a prefabricated waveguide mesh structure with pairs of coupled waveguides, known as Tunable Basic Units (TBU). By configuring each TBU, constructive, destructive, or partial interference can be achieved in each complementary output port, which leads to the routing of the signal and the definition of the circuit topology and design parameters. Although these circuits sacrifice footprint, power consumption, and optical gain, they provide an unprecedented versatility and flexibility, which allows applications that are not possible in a standard PIC of specific applications. FIGS. 4a to 4d illustrate different waveguide mesh combinations and topologies proposed in the literature for this purpose, wherein the directional photonic coupler of the present disclosure has been included as a TBU ("Tunable Basic Unit"). Specifically, FIG. 4a shows a photonic structure of a triangular structure 16, FIG. 4b shows a square structure 17, FIG. 4c shows a hexagonal structure 18, and FIG. 4d shows a mesh structure 19 with arrows indicating the input and the output.

To program complex and extensive waveguide mesh structure-based systems, moderate TBU losses (0.25 dB/TBU) seriously decreases the overall circuit performance. To overcome this limitation, the incorporation of the directional photonic coupler of the present disclosure to replace the current TBU design based on 3-dB MZI devices reduces losses in programmed waveguide mesh circuits, which leads to FIGS. comparable to those of similar circuits designed using ASPICs (Application Specific Photonic Integrated Circuits). When compared with the balanced 3-dB MZI TBU approach, due to the miniaturization capacity that does not compromise losses, a triple improvement in time resolution is also obtained.

Figure 5:
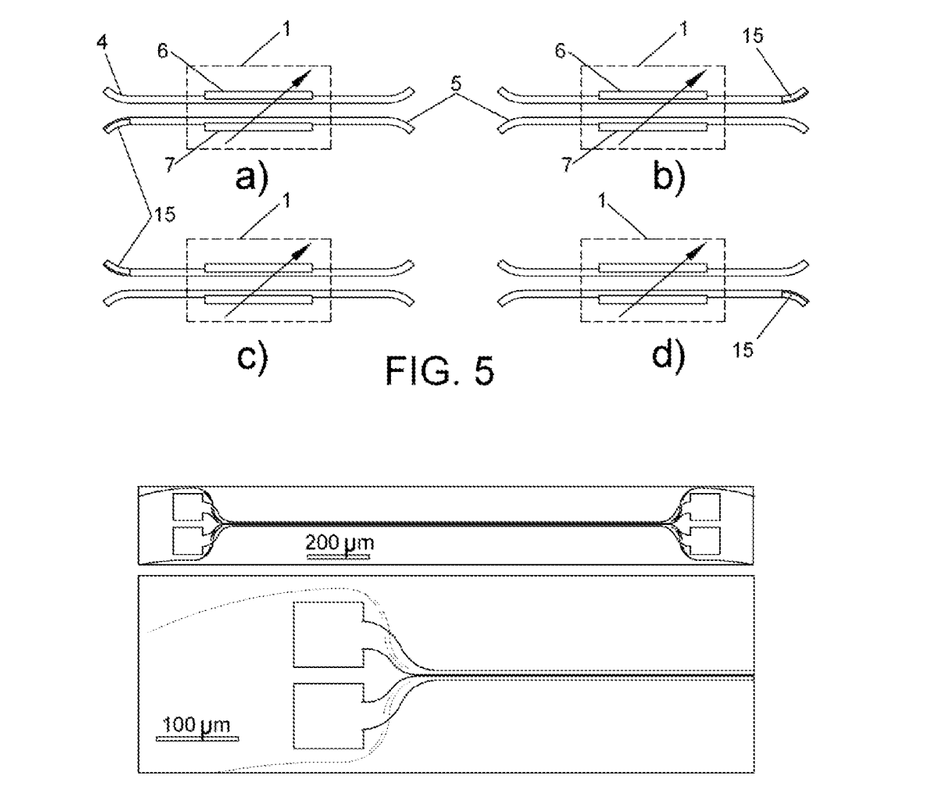
FIG. 5 shows the directional photonic coupler of the present disclosure with three phase shifters, wherein one of them is at the input or at the output of the waveguides.

Additionally, the directional photonic coupler of the present disclosure may have a third phase shifter 15 as shown in FIG. 5. With the third phase shifter 15, an additional phase difference independent of that introduced by the phase shifters 6 and 7 on any of the propagating signals can be included at the output or at the input of any of the waveguides 4, 5. The third phase shifter 15 can therefore be located at the input (FIGS. 5a and 5c) or at the output (FIGS. 5b and 5d) of the waveguides 4, 5.

Figure 6:
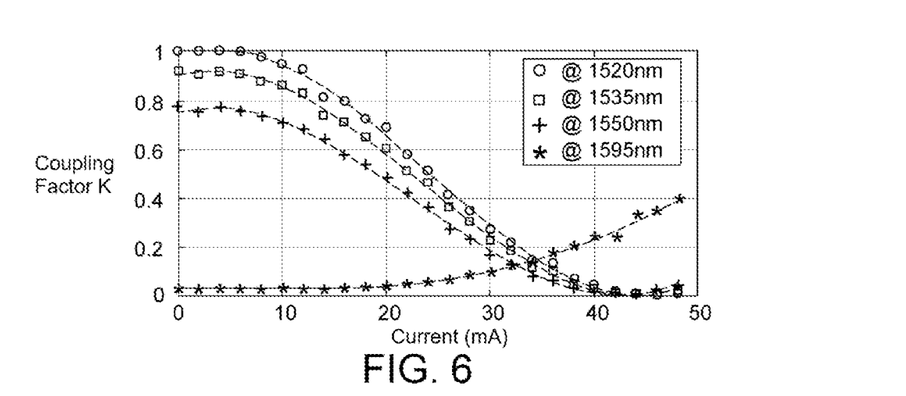
FIG. 6 shows a laboratory embodiment for experimental measurements of the directional photonic coupler of the present disclosure.

Lastly, FIGS. 6a and 6b show a laboratory fabrication for measuring experimental results of the directional photonic coupler of the present disclosure. It has been designed and fabricated under a Multi Project Wafer (MPW), running a directional photonic coupler like the one of the present disclosure in a silicon nitride platform, illustrated in FIG. 6A. A tunable laser sweeping from 1520 to 1620 nm has been used for measurements, followed by a polarization controller before accessing the chip by means of optical fibers. The data was acquired by an optical spectrum analyzer for each programmed electrical power value.

In this case, a single-mode waveguide having a width of 1 µm and a height of 300 nm was used to propagate a TE (Transverse Electric) field. The gap between the waveguides (g) was set to 1.5 µm, leading to a theoretical total coupling length of 717 µm. However, the decision was made to increase the final coupler length L to 1235 µm to increase the safety of the thermal tuners (phase shifters) and to check the analytical model rather than to find a perfect passive cross state, and before proceeding to an optimization round. For the metal layer, a distance between phase shifters (d) of 2 µm was considered. The optical crosstalk was kept between 15 and 21 dB for the cross and bar operations, while a bandwidth >5 nm was obtained for a ±2% uniformity. The total excess loss was insignificant and estimated to be below 0.1 dB. FIG. 6b illustrates the change of the power coupling factor K versus the applied electric current in four different wavelengths. The model was validated and predicts fabrication errors in the width range of 15 nm and gap variation of 70 nm.

For the directional photonic coupler shown in FIG. 6a, the power consumption needed for the coupling factor reconfigurability from 1 to 0 is greater than in a conventional MZI approach if a thermal adjustment mechanism is used (i.e., a power consumption of 270 mW is measured for the MZI approach and 460 mW is estimated for the TDC approach in the same integration platform). The reason behind this is the proximity of the two waveguides and the resulting unoptimized thermal interference that more seriously affects the common phase change rather than the differential phase change. However, if the structure is optimized, accordingly by changing "d" and "g", the electrical power consumption can be considerably reduced. With the state of the art, TDCs with phase shifting capacities of less than 700 µm and 100 µm in silicon nitride and silicon on insulator platforms could be achieved, respectively, representing a more than threefold length decrease with respect to the MZI-based TBU approaches. Furthermore, alternative adjustment mechanisms like the electromechanical effect seem to be a promising option to achieve low-power, low-loss, and shorter TDCs.

The invention claimed is:

1. A directional photonic coupler independent tuning of a coupling factor and a phase difference, the directional photonic coupler comprising:
    a first waveguide with a propagation coefficient, denoted as $\beta_1$, and a second waveguide with a propagation coefficient, denoted as $\beta_2$;
    an input and an output of the first waveguide and an input and an output of the second waveguide;
    a first phase shifter, located at a predetermined distance from the first waveguide, configured to modify the propagation coefficient, denoted as $\beta_1$, of the first waveguide; and
    a second phase shifter, located at a predetermined distance from the second waveguide, configured to modify the propagation coefficient, denoted as $\beta_2$, of the second waveguide;
    wherein the first phase shifter and the second phase shifter are configured such that, by independent modification of the propagation coefficient, denoted as $\beta_1$, of the first waveguide and of the propagation coefficient, denoted as $\beta_2$, of the second waveguide, respectively, a coupling factor, denoted as "K," between an optical input signal of one of the first waveguide or the second waveguide and optical output signals of the first waveguide and the second waveguide, is tuned, and
    wherein, by equal and simultaneous modification of the propagation coefficient, denoted as $\beta_1$, of the first waveguide and of the propagation coefficient, denoted as $\beta_1$, of the second waveguide, respectively, a common phase difference of the optical output signals of the first waveguide and the second waveguide is tuned.

2. The directional photonic coupler of claim 1, further comprising a substrate and a cladding, wherein the cladding is located on the substrate, which comprises therein at least the first waveguide and the second waveguide, with the first phase shifter and the second phase shifter located on the cladding.

3. The directional photonic coupler of claim 2 further comprising a third phase shifter located in an input of one of the first waveguide or the second waveguide, wherein the third phase shifter is configured to introduce a phase difference before the phase difference introduced by the first phase shifter and the second phase shifter.

4. The directional photonic coupler of claim 3, wherein the microprocessor is additionally connected to a plurality of optical power monitors at one or both outputs of the directional photonic coupler for reading and calculating the coupling factor, denoted as K.

5. The directional photonic coupler of claim 2 further comprising a third phase shifter located in an output of one of the first waveguide or the second waveguide, wherein the third phase shifter is configured to introduce a phase difference after the phase difference introduced by the first phase shifter and the second phase shifter.

6. The directional photonic coupler of claim 2 further comprising a microprocessor connected to the first phase shifter and to the second phase shifter for the activation thereof, wherein the microprocessor calculates the change in the propagation coefficient, denoted as $\beta_1$, of the first waveguide to obtain the coupling factor, denoted as K, and wherein the microprocessor also calculates the simultaneous variation of the propagation coefficient, denoted as $\beta_1$, of the first waveguide and the propagation coefficient, denoted as, $\beta_2$, of the second waveguide to obtain the phase difference.

7. The directional photonic coupler of claim 1 further comprising a third phase shifter located in an input of one of the first waveguide or the second waveguide, wherein the third phase shifter is configured to introduce a phase difference before the phase difference introduced by the first phase shifter and the second phase shifter.

8. The directional photonic coupler of claim 7 further comprising a microprocessor connected to the first phase shifter and to the second phase shifter for the activation thereof, wherein the microprocessor calculates the change in the propagation coefficient, denoted as $\beta_1$, of the first waveguide to obtain the coupling factor, denoted as K, and wherein the microprocessor also calculates the simultaneous variation of the propagation coefficient, denoted as $\beta_1$, of the first waveguide and the propagation coefficient, denoted as, $\beta_2$, of the second waveguide to obtain the phase difference.

9. The directional photonic coupler of claim 1 further comprising a third phase shifter located in an output of one of the first waveguide or the second waveguide, wherein the third phase shifter is configured to introduce a phase difference after the phase difference introduced by the first phase shifter and the second phase shifter.

10. The directional photonic coupler 9 further comprising a microprocessor connected to the first phase shifter and to the second phase shifter for the activation thereof, wherein the microprocessor calculates the change in the propagation coefficient, denoted as $\beta_1$, of the first waveguide to obtain the coupling factor, denoted as K, and wherein the microprocessor also calculates the simultaneous variation of the propagation coefficient, denoted as $\beta_1$, of the first waveguide the propagation coefficient, denoted as $\beta_2$, of the second waveguide to obtain the phase difference.

11. The directional photonic coupler of claim 10, wherein the microprocessor is additionally connected to the third phase shifter the activation thereof.

12. The directional photonic coupler of claim 10, wherein the microprocessor is additionally connected to a plurality of optical power monitors at one or both outputs of the directional photonic coupler for reading and calculating the coupling factor, denoted as "K".

13. A photonic integrated circuit "(PIC)" comprising the directional photonic coupler of claim 1.

14. A coupled resonator comprising the directional photonic coupler of claim 1.

15. The directional photonic coupler of claim 1 further comprising a microprocessor connected to the first phase shifter and to the second phase shifter for the activation thereof, wherein the microprocessor calculates the change in the propagation coefficient, denoted as $\beta_1$, of the first waveguide to obtain the coupling factor, denoted as K, and wherein the microprocessor also calculates the simultaneous variation of the propagation coefficient, denoted as $\beta_1$, of the first waveguide and the propagation coefficient, denoted as, $\beta_2$, of the second waveguide to obtain the phase difference.

* * * * *

UNITED STATES PATENT AND TRADEMARK OFFICE
CERTIFICATE OF CORRECTION

| | | |
|---|---|---|
| PATENT NO. | : 11,579,368 B2 | Page 1 of 1 |
| APPLICATION NO. | : 17/290062 | |
| DATED | : February 14, 2023 | |
| INVENTOR(S) | : Lopez et al. | |

It is certified that error appears in the above-identified patent and that said Letters Patent is hereby corrected as shown below:

In the Claims

Column 9, Line 56, Claim 1, after "coupler" insert -- with --

Column 10, Line 11, Claim 1, delete ""K,"" and insert -- K, --

Column 10, Line 18, Claim 1, delete "$\beta_1$," and insert -- $\beta_2$, --

Column 10, Line 21, Claim 2, delete "1," and insert -- 1 --

Column 10, Line 52, Claim 6, delete "as," and insert -- as --

Column 11, Line 1, Claim 8, delete "as," and insert -- as --

Column 11, Line 9, Claim 10, delete "9" and insert -- of claim 9 --

Column 11, Line 16, Claim 10, after "waveguide" insert -- and --

Column 11, Line 21, Claim 11, after "shifter" insert -- for --

Column 12, Line 5, Claim 12, delete ""K"." and insert -- K. --

Column 12, Line 6, Claim 13, delete ""(PIC)"" and insert -- (PIC) --

Column 12, Line 18, Claim 15, delete "as," and insert -- as --

Signed and Sealed this
Second Day of May, 2023

*Katherine Kelly Vidal*

Katherine Kelly Vidal
*Director of the United States Patent and Trademark Office*